Patented Oct. 21, 1947

2,429,320

UNITED STATES PATENT OFFICE 2,429,320

METHOD OF STRESS-RELIEF OF WELDED STRUCTURES

Harry E. Kennedy, Berkeley, Calif., assignor to The Linde Air Products Company, a corporation of Ohio No Drawing. Application February 22, 1944, Serial No. 523,492

22 Claims. (Cl. 148—13)

This invention relates to the relief of residual or "locked-up" stresses occurring in members which have been subjected to localized intense heat such as that employed in welding or cutting metal.

When a restrained metal member is heated, the normal expansion of the metal under the influence of heat is impeded. Restraint of expansion produces a compressive stress in the member. If the temperature of the member is raised high enough, the compressive stress will become of greater magnitude than the yield strength of the metal, and the metal will yield to the stress, becoming upset. If the metal is now permitted to cool, and its normal contraction is restrained, tensile stress is produced. Thus, simply by heating and cooling a restrained member, large residual stresses are produced.

When a weld is made in a large mass of metal, or when large members are joined by welding, the expansion and contraction of metal at the weld zone under the influence of heating and cooling are restrained by the large mass of metal that is not affected by the heat of welding. In the case of fusion-deposition welding, where a deposit of molten metal is formed, contraction of the deposited metal on cooling is restrained by the base metal. As a result of this restraint, large residual stresses are locked-up in the welded structure.

Ever since the introduction of welding for production, engineers have been confronted with the problems presented by these residual stresses. Much time, money, and effort have been expended in studying their formation and characteristics, in seeking to avoid their formation, and in seeking to relieve them. Considerable progress has been made in the study of the characteristics of residual stresses in welded structures, but no practicable method of avoiding their formation or of relieving them has been brought forth in the past for large welded structures.

It has been observed that the principal locked-up stress in a welded structure consisting of two or more large members joined by butt welds exists along the line of the deposited weld metal and the closely adjacent metal. This stress is referred to as the longitudinal stress. It is a tensile stress, and the highest unit stress approximates the room-temperature yield strength of the metal of which the weld zone is composed. Parallel with this stress and on either side of the weld and usually equally spaced from it are two complementary compression stresses. The magnitude of compression stress is generally very small because the area in compression is large. Transverse to the weld are stresses, generally compression, of relatively low magnitude except at each end of the weld where, in the case of long welds, the highest unit stress may approach the yield strength of the metal. This stress pattern is produced in all butt-welded structures where the weld zone is restrained, whether the weld is made manually or by automatic methods.

Several expedients for avoiding the formation of large residual stresses in welded structures have been proposed. For instance, it has been proposed that metal members to be joined by welding be preheated; but preheating is impracticable for large members in which the greatest stress problems are encountered. Another proposal has been that large welds be made by depositing a number of small welding beads and then tying these beads together by a final deposition of weld metal. This method not only fails to eliminate residual stress but deprives welding of one of its principal advantages as a construction process, its speed. Still other proposals include "block" welding, in which alternate blocks or sections of a weld seam separated from each other are produced, and "back-step" welding in which a deposit is produced in steps, each deposit being started ahead of a previous deposit and worked back to the previous one. Both of these methods are slow, and neither eliminates residual stress formation.

There have also been many proposed methods of relieving residual stresses present in welded structures, but no completely satisfactory method adaptable to use for large structures has been advanced in the past. Considerable reduction of residual stresses may be obtained by heating, in a furnace, a welded structure to a temperature at which the yield strength of the metal of which it is composed is quite low, usually about 600° C. to 650° C. in the case of steel, and by slowly cooling it, but this method is expensive, produces scaling of metal and distortion of the structure treated, and is of course inapplicable to the many very large structures being welded today. A so-called "local" stress-relieving heat treatment has been advocated for use on large structures, in which treatment a weld and the adjacent area are heated to a high temperature and slowly cooled. This local heat treatment has been used rather widely for treating some types of weld, for instance girth welds in pressure vessels, but for general use it is not satisfactory because instead of reducing the magnitude of the longitudinal tensile unit stress encountered in butt welds, it tends merely to broaden the area subject to the locked-up tensile stress. Another expedient that has had some advocates is the peening of weld zones. If properly done, peening affords some measure of stress-relief, but it is difficult to control. Peening may produce strain-hardening or cracks, and may even introduce further residual stresses.

Thus, there has been in the past no completely satisfactory solution to the problems raised by residual stresses in large welded structures, despite years of effort by welding engineers. The problems are important, for residual stresses may sometimes be a cause of failure of welded structures resulting in loss of life and property. For example, there have been failures of welded ships in which the evidence suggests that residual stresses, although not the primary cause of failure, have been important contributing factors. Although such failures have been few when compared with the very great number of large structures that have been welded, the possibility of their occurrence has obstructed to some extent the more widespread adoption of welding as a construction process. There is accordingly an insistent demand for a solution to the residual stress problem.

It is the principal object of the present invention to satisfy this demand. More specifically, it is the primary object of the invention to provide a method of relieving residual or locked-up stresses in welded structures. Another object is a method of stress-relieving structures of any size or shape.

In accordance with the invention a substantial difference in temperature is established between the stressed area of a welded metal member containing residual tensile stresses and the adjacent stressed areas containing the balancing compressive stresses, the difference being such that metal under tensile stress is at a lower temperature than metal under compression stress and the magnitude of the difference being so great as to cause permanent deformation of stressed metal.

The temperature difference may be attained in a variety of ways. For instance, the area containing tensile stress may be refrigerated, or heat may be applied in or near the areas containing compression stresses. In some cases it may be desired both to cool the tensile stress areas and to heat the compression stress areas. In any event, a temperature gradient, which generally need not be very steep, is established between the tensile stress area and the compression stress areas, the tensile stress area being at a lower temperature, usually not much above room temperature. When the welded structure is restored throughout to atmospheric temperature, a considerable reduction in residual stress will have been achieved.

When heat is applied, the metal at the heated areas expands. Since these areas are rigidly joined by the weld to the metal under tension and the latter is not correspondingly expanded by heat, the expansion imparts an additional load on the tensed metal. The residual stress in the tensed metal already approximates its yield strength. Accordingly, the tensed metal must yield under the influence of the tensile stress locked-up within it and the additional load placed on it by the expansion of the heated metal. Although the yielding, or "permanent set," in the tensed metal is relatively small compared to the size of the welded structure, when the members are allowed to regain the same temperature, it will be found that the residual stresses are considerably reduced in magnitude and that the highest unit stresses are well below the yield strength of the metal.

A similar result is achieved when the tensile stress area of a structure containing residual stresses is refrigerated. In this case, refrigeration of the tensed metal causes it to contract and imparts an additional load which together with the tensile stress already present is sufficient to cause permanent set and consequent relief of stress.

It has been demonstrated by many experiments that the invention provides effective relief of residual stress, reductions of 50% and more in residual unit stress having thus been attained. Such reduction of stress is of the order of that obtained in the stress-relieving heat treatment in which a complete welded structure is heated in a furnace. Under favorable conditions, complete freedom from residual tensile stress in the weld metal has been achieved, a result unobtainable by any previously known method of stress-relief of welds.

To arrive at the best conditions for stress-relief according to the method of this invention, the stress pattern of the member to be treated should be known. One satisfactory method for determining the stress pattern is to prepare a sample welded structure of the type to be produced, using the welding conditions and the materials to be used for the structure to be produced, and to make strain gauge measurements of the sample structure as welded. The measured sections are then removed from the structure, as by a trepanning operation, and strain gauge measurements again made using the same references. The differences in strain observed are indications of the stresses originally present in the sample structure from which the stress pattern of the structure may be derived in known manner. Since this pattern will be reproduced for every structure made in the same way, it need be determined only once.

By the practice of the invention the longitudinal stress at the weld zone has been reduced 50% or more. Stress reduction has been achieved both by refrigerating the tensile stress area and by applying heat in bands within or overlapping the compression stress areas, and by a combination of these operations. In general, it has been found that adequate stress-relief of butt-welded plates is obtained if the tensile stress area is about 50° C. to 175° C. cooler than the compression stress areas. In plate up to about one inch thick this result may be obtained by heating a narrow band on each side of the weld to about 150° C. to 200° C. higher than the weld metal, the heated band being about three to five inches away from the weld.

A convenient refrigerant for use in the practice of the invention is solid carbon dioxide. This may simply be heaped on the metal in or adjacent a tensile stress area and allowed to remain until the area is thoroughly chilled to the desired extent. Suitably, dams, for example of wood, are used to confine the refrigerant. Other refrigerants may of course be used, but if the refrigerant is not capable of providing a temperature low enough to achieve the desired temperature gradient between the tensile stress area and the compression stress areas it will be necessary to apply heat to the compression stress areas.

For the application of heat to compression stress areas in accordance with the invention, oxy-fuel gas torches are convenient. When treating butt-welded plate, it is usually preferable that both compression areas be heated simultaneously. Good results may be obtained using manually operated torches for progressively heating successive portions of the compression stress areas. If desired, torches mounted on a mobile carriage may be used, and may be preferable because a more uniform rate of travel of the torches may thus be obtained. Other types of torches have been used successfully. For instance a long tube provided with a line of evenly spaced jets is suitable when a great number of butt-welded structures of a given length are to be treated. For some applications it may be desirable to apply heat in relatively broad bands, say about six or more inches wide; in others in relatively narrow bands. In the former cases torches similar to those used for flame cleaning of metal surfaces are suitable.

Heat may be applied to either surface of the member to be treated, or to both surfaces. Generally, it has been found that satisfactory heating may be achieved in plate up to about one inch thick by applying heat to only one surface, but for thicker plate it may be advisable to apply heat to both surfaces.

Desired heating of the compression stress areas may be accomplished electrically, either by inductive or by resistance heating. An advantage of electrical heating is that a uniform temperature may be achieved throughout the compression areas of a thick plate without undue heating of the surface of the plate. Undue heating may, under some circumstances, cause the compressed areas to become upset.

Even when the metal at the tensile stress area is not refrigerated during heating of the compression stress area it is usually desirable to keep the tensile stress area cool. This result may be accomplished by spraying the tensed metal with water or applying another coolant such as a stream of air.

Also, it is usually desirable to cool the heated metal promptly after the desired stretching of the weld metal has been accomplished. A spray of water or other cooling means may immediately follow the heating means in its travel along the metal.

Although experience has shown that the critical residual stress in welded structures is the tensile stress parallel to the weld and that relief of this stress is generally all that need be achieved, it may sometimes be desired to relieve stresses that exist transverse to the weld. In a butt-welded structure, transverse residual stresses are usually negligible except at the very ends of the weld. Here, the transverse stress is compressive and may approach the yield strength of the metal at the weld zone. When this condition exists, there is a tensile stress transverse to the weld between the transverse compression stress areas.

The transverse residual stresses may be relieved by the application of heat to the compression stress zones. In contrast to the heating applied to relieve longitudinal tensile stress, for the relief of the transverse compression stress sufficient heat is applied to the compression stress areas to cause upsetting or deformation of metal within the heated zone. This deformation results in reduction of stress. By this means not only are the transverse compression stresses at the ends of the structure relieved, but relief of the transverse tensile stress between the compression areas is also obtained.

The invention thus provides an eminently satisfactory method of reducing residual stresses in structures of any size or shape. Because the degree of heating necessary to its successful operation is slight, the method is economical to practice, and no damage is done to the structure by scaling or oxidation. Because of its flexibility, it is suitable for the treatment of sub-assemblies or of finished structures.

Although for the purpose of illustration of its principles, considerable emphasis has been placed in this description of the application of the invention to butt-welded structures the invention is not limited to the treatment of such structures but is generally applicable to treatment of any structure containing residual stresses.

I claim:

1. A method of relieving residual stress induced by welding which comprises establishing in a welded metal member containing an area of residual tensile stress and a complementary area of residual compression stress a temperature gradient such that said area of residual tensile stress is at a temperature sufficiently below that of said area of compression stress to cause permanent deformation of metal in said tensile stress area.

2. A method of thermally relieving residual stress induced by welding which comprises establishing in a welded metal member containing an area of residual tensile stress and a complementary area of residual compression stress a temperature gradient such that said area of tensile stress is at a temperature about 50° C. to 175° C. lower than the temperature of said compression stress area.

3. A method of thermally relieving residual stress induced by welding in a welded metal member which contains an area of residual tensile stress and a complementary area of compression stress, which method comprises refrigerating said member in the vicinity of said tensile stress area to such an extent as to cause permanent deformation of said member in said tensile stress area.

4. A method of thermally relieving residual stress induced by welding in a welded metal member which contains an area of residual tensile stress and a complementary area of compression stress, which method comprises heating said member in the vicinity of said compression stress area to such an extent as to cause permanent deformation of said member in said tensile stress area.

5. A method of thermally relieving residual stress induced by welding in a welded metal member containing an area of residual tensile stress and a complementary area of residual compression stress, which method comprises refrigerating said area of tensile stress and heating said area of compression stress, whereby to establish in said member a temperature gradient of sufficient magnitude to cause permanent deformation of metal subject to said tensile stress.

6. A method of relieving residual stress induced by welding in a welded metal structure containing an area of residual tensile stress and a complementary area of residual compression stress parallel to a weld in such structure, which method comprises establishing in said structure a temperature gradient such that the temperature of said area of tensile stress is lower than that of said area of compression stress and of sufficient magnitude to cause permanent deformation of metal in said tensile stress area.

7. A method of thermally relieving residual stress induced by welding in a welded metal structure containing an area of residual tensile stress and a complementary area of residual compression stress parallel to a weld in such structure, which method comprises heating said area of compression stress to a temperature about 50° C. to 175° C. higher than said area of tensile stress and thereafter restoring said areas of tensile stress and compression stress to substantially uniform temperature.

8. A method as defined in claim 7 in which said heating is accomplished by the application of flames to said structure in the vicinity of said area of compression stress.

9. A method as defined in claim 7 in which said heating is accomplished electrically.

10. A method of thermally relieving residual stress induced by welding in a welded metal structure containing an area of residual tensile stress and a complementary area of residual compression stress parallel to a weld in such structure, which method comprises refrigerating said area of tensile stress to a temperature about 50° C. to 175° C. lower than said area of compression stress and thereafter restoring said areas of tensile stress and compression stress to substantially uniform temperature.

11. A method of thermally relieving residual stress induced by welding in a welded metal structure containing an area of residual tensile stress and a complementary area of residual compression stress parallel to a weld in such structure, which method comprises heating said area of compression stress while refrigerating said area of tensile stress, thus producing a temperature gradient of about 50° C. to 175° C. between said areas and thereafter restoring said areas of tensile stress and compression stress to substantially uniform temperature.

12. A method of thermally relieving residual stress induced by welding in a butt-welded metal structure containing an area of residual tensile stress in, and an area of residual compression stress parallel to, a butt weld in said structure, which method comprises progressively applying heating flames to successive portions of metal in the vicinity of said area of compression stress, thus heating said area of compression stress to a temperature about 50° C. to 175° C. above the temperature of said tensile stress area.

13. A method of thermally relieving residual stress induced by welding in a butt-welded metal structure containing an area of residual longitudinal tensile stress in a butt weld in such structure, and, parallel to said weld, two areas of residual compression stress, one each of said compression stress areas being on either side of said tensile stress area, which method comprises simultaneously and progressively applying heating flames to successive portions of metal in the vicinity of said areas of compression stress, thus heating said areas of compression stress to a temperature about 50° C. to 175° C. above the temperature of said tensile stress area.

14. A method of thermally relieving residual stress induced by welding in a welded metal structure containing an area of residual tensile stress and an area of residual compression stress parallel to a weld in such structure and an area of residual compression stress and an area of residual tensile stress transverse to said weld, which method comprises applying heat to said compression stress area parallel to said weld, thus establishing between said area of tensile stress parallel to said weld and said area of compression stress parallel to said weld a temperature gradient of sufficient magnitude to cause permanent deformation of metal in said weld, and applying heat to said compression stress area transverse to said weld to cause permanent deformation of metal within said compression stress area transverse to said weld.

15. A method of thermally relieving residual stress induced by welding in a butt-welded metal structure containing an area of residual tensile stress in, and an area of residual compression stress parallel to, a butt weld in such structure and an area of residual compression stress and an area of residual tensile stress transverse to said weld, which method comprises applying heating flames to said structure in the vicinity of said compression stress area parallel to said butt weld, raising the temperature of said area to about 50° C. to 175° C. above the temperature of said tensile stress area parallel to said weld and then heating said compression area transverse to said weld to a temperature sufficient to cause permanent deformation of metal within said compression area transverse to said weld.

16. A method of thermally relieving residual stress induced by welding in a welded metal structure which contains an area of residual tensile stress in, and areas of residual compression stress parallel to, a weld in said structure, which method comprises progressively applying heating flames to successive portions of metal in the vicinity of said areas of compression stress, thus heating said areas of compression stress to a temperature about 50° C. to 175° C. above the temperature of said tensile stress area, while progressively applying a cooling fluid, following said heating flames, to the metal in the vicinity of said tensile stress area.

17. A method as claimed in claim 16 in which the cooling fluid is water.

18. A method of relieving residual stress, induced by welding, in a weld seam in a welded metal structure, which method comprises heating elongated areas of said metal structure in close proximity to and substantially parallel to said seam on both sides thereof, without otherwise applying heat to said seam, thus raising the temperature of said heated areas to about 50° C. to 175° C. above that of said seam.

19. A method of relieving residual stress, induced by welding, in a weld seam in a welded metal structure, which method comprises progressively applying heat to successive areas of said metal structure in close proximity to and substantially parallel to said seam on both sides thereof, without otherwise applying heat to said seam, thus raising the temperature of said heated areas to about 50° C. to 175° C. above that of said seam.

20. A method of relieving residual stress, induced by welding, in a weld seam in a welded metal structure, which method comprises progressively applying heating flames to successive areas of said structure in close proximity to and substantially parallel to said seam on both sides thereof, thus raising the temperature of said areas to about 50° C. to 175° C. higher than that of said weld seam, while progressively applying to said weld seam a cooling fluid following said heating flames.

21. A method of relieving residual stress induced by welding in a weld seam in a welded metal structure, which method comprises progressively applying heat to successive areas of said metal structure in close proximity to and substantially parallel to said seam on both sides thereof, thus raising the temperature of said heated areas to about 50° C. to 175° C. higher than that of said weld seam, and progressively applying a cooling fluid to said areas following the application of heat thereto.

22. A method as defined in claim 21 in which said heating is accomplished by the application of flames to said areas and in which said cooling fluid is water.

HARRY E. KENNEDY.

REFERENCES CITED

The following references are of record in the file of this patent:

UNITED STATES PATENTS

| Number | Name | Date |
|---|---|---|
| 2,315,558 | Somes | Apr. 6, 1943 |

OTHER REFERENCES

Welding Handbook, 1942 ed., pages 1081 to 1083, and 1091.